United States Patent [19]
Chang

[11] Patent Number: 5,244,286
[45] Date of Patent: Sep. 14, 1993

[54] PNEUMATIC SHAFT ASSEMBLY OF MACHINE TOOL

[76] Inventor: Pao-Yuang Chang, No. 20-5, Long-Shan Lane, Chung-Ching Rd., Ta-Ya Hsiang, Taichung Hsien, Taiwan

[21] Appl. No.: 892,910

[22] Filed: Jun. 3, 1992

[51] Int. Cl.⁵ .............................. F16C 32/06
[52] U.S. Cl. ................................ 384/118
[58] Field of Search ............... 384/118, 111, 119, 114, 384/120, 107

[56] References Cited

U.S. PATENT DOCUMENTS

| | | | |
|---|---|---|---|
| 2,660,485 | 11/1953 | Gerard | 384/118 |
| 3,030,744 | 4/1962 | Mueller . | |
| 3,385,641 | 5/1968 | Foglia | 384/118 |
| 3,776,609 | 12/1973 | Pichette . | |
| 4,302,060 | 11/1981 | Nicholas et al. | 384/111 |

Primary Examiner—Lenard A. Footland
Attorney, Agent, or Firm—Browdy and Neimark

[57] ABSTRACT

A pneumatic shaft assembly of machine tool has a housing, a sleeve lodged securely in the housing, and a shaft received in the sleeve. The sleeve is provided with an annular gas chamber and the two sets of balancing chambers in communication with the annular gas chamber. Each of the balancing chambers has a plurality of circular bores of identical diameter. The housing is furnished with an opening, which communicates with the annular gas chamber and permits the compressed gas to pass therethrough to enter the annular gas chamber, from which the compressed gas is directed to flow to the circular bores of the balancing chambers so that the compressed gas is uniformly distributed via the circular bores to a clearance formed between the shaft and the sleeve so as to reduce the friction between the shaft and the sleeve at such time when the shaft rotates or moves axially in relation to the sleeve.

2 Claims, 2 Drawing Sheets

PNEUMATIC SHAFT ASSEMBLY OF MACHINE TOOL

BACKGROUND OF THE INVENTION

The present invention relates to a pneumatic shaft assembly of machine tool.

As shown in FIGS. 1 and 2, the U.S. Pat. No. 3,776,609 discloses a pneumatic shaft bearing assembly having a shaft 1 received in a sleeve 2 which is secured firmly to a housing 3 and provided on the external surface thereof with an annular groove 4. There are two sets of balancing rooms 5 and 6 located equidistantly to the left and the right of the annular groove 4. Each of the balancing rooms 5 and 6 is provided with the two bores 7 and 8 communicating with the interior of the sleeve 2 and with the annular groove 4 via two channels 9 and 10. The wall of the housing 3 has an opening 11 in communication with the annular groove 4 so as to permit the compressed air to enter the sleeve 2 via the opening 11, the annular groove 4, the channels 9 and 10, and the bores 7 and 8. The compressed air exerts a lateral balancing force on the shaft 1 so that the shaft 1 rotates or moves axially inside the sleeve 2 with a minimum of frictional force.

The prior art shaft assembly described above is defective in design in that the entry of the compressed air into the sleeve 2 can be obstructed by the channels 9 and 10 clogged by dust or foreign objects. In addition, the construction of such channels increases the overall cost of making the shaft assembly.

SUMMARY OF THE INVENTION

It is, therefore, the primary objective of the present invention to provide a pneumatic shaft assembly of machine tool with means permitting the compressed air to bypass the channels of the sleeve to exert uniformly a lateral pressure on the shaft.

It is another objective of the present invention to provide a pneumatic shaft assembly of machine tool, which can be manufactured easily and economically.

In keeping with the principles of the present invention, the foregoing objectives of the present invention are accomplished by a pneumatic shaft assembly of machine tool, which comprises a housing, a sleeve enclosed in the housing, and a uniformly dimensioned shaft that is received in the sleeve in such a manner that it can rotate and move axially in relation to the sleeve. The external surface of the sleeve is provided with an annular gas chamber of a length and a depth and with the two sets of balancing chambers located separately at both ends of the annular gas chamber in such a manner that they communicate with the annular gas chamber. Each of the balancing chambers comprises at least three bores having the same diameter. Each bore is so situated as to be on the same plane perpendicular to the central axis of the sleeve. All bores are arranged to encircle equidistantly the central axis of the sleeve. The housing is furnished with an opening in communication with the annular gas chamber for the purpose of introducing the compressed air into the annular gas chamber. The compressed air in the annular gas chamber is uniformly and directly distributed via bores to the clearance between the shaft and the sleeve so as to cause each of the balancing chambers to generate a lateral balancing force of equal magnitude, which exerts on the shaft. In other words, the compressed air, which is introduced into the shaft assembly, is uniformly distributed throughout the clearance between the shaft and the sleeve so that the shaft can rotate or move axially in relation to the sleeve with a minimum of friction.

The foregoing objectives and features will be better understood by studying the following detailed description of a preferred embodiment of the present invention, in conjunction with the drawings provided herewith.

DETAILED DESCRIPTION OF THE PREFERRED EMBODIMENT

Figure 1:
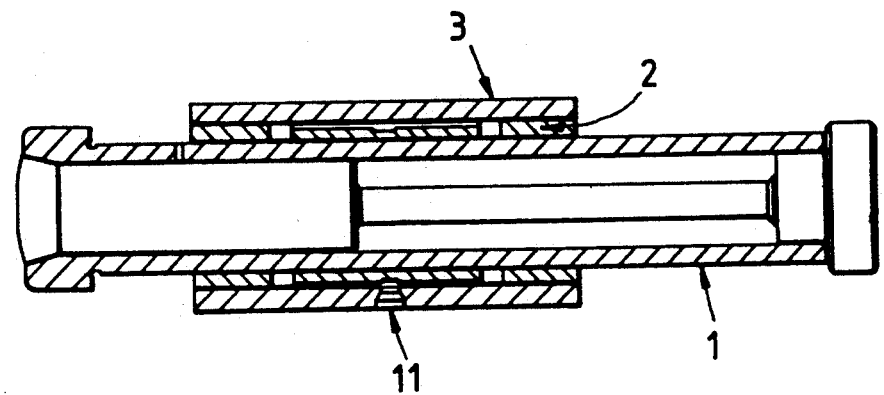
FIG. 1 shows a sectional view of a pneumatic shaft assembly of the prior art.
Figure 2:
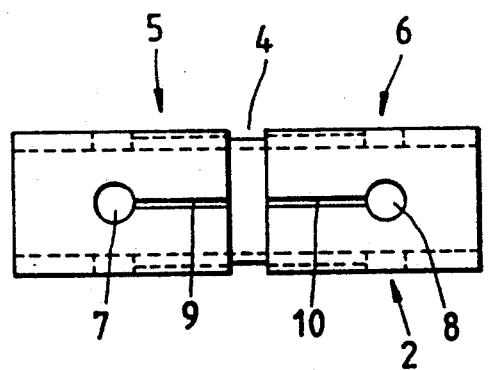
FIG. 2 shows a front view of a sleeve of the prior art pneumatic shaft assembly as shown in FIG. 1.
Figure 3:
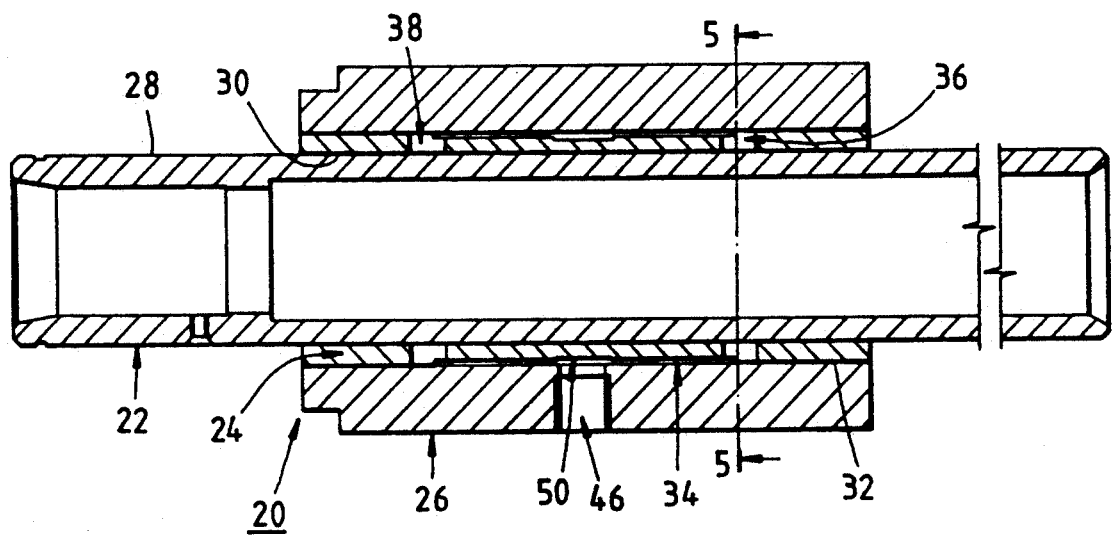
FIG. 3 shows a sectional view of a pneumatic shaft assembly embodied in the present invention.
Figure 4:
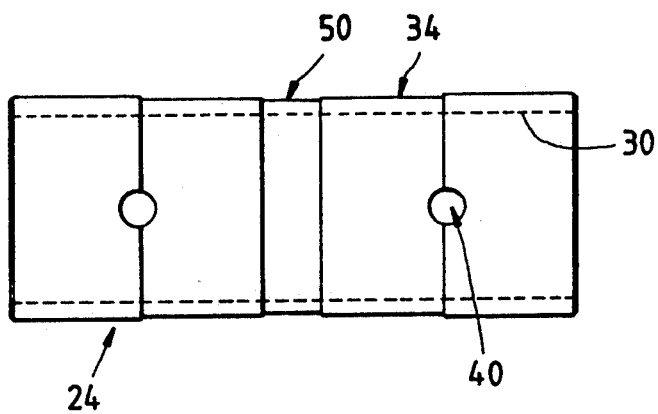
FIG. 4 shows a front view of a sleeve of the pneumatic shaft assembly of the present invention.
Figure 5:
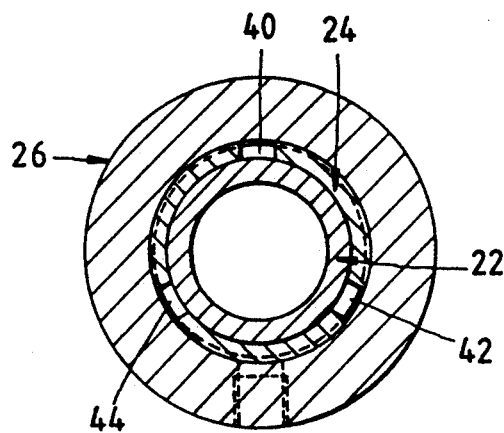
FIG. 5 shows a sectional view of a portion taken along the line 5—5 as shown in FIG. 3.

Referring to FIGS. 3, 4 and 5, a pneumatic shaft assembly 20 of the present invention is shown comprising a shaft 22, a sleeve 24, and a housing 26.

The shaft 22 is uniformly dimensioned and provided with an outer surface 28. The sleeve 24 of cylindrical construction has an axial hole 30 with an inner diameter slightly larger than the outer diameter of the shaft 22, which is received in the axial hole 30 of the sleeve 24 in such a manner that it can rotate or move axially in relation to the sleeve 24.

The housing 26 has an axial hole 32 dimensioned to receive therein the sleeve 24, which is firmly united with the housing 26.

The sleeve 24 is provided with an annular gas chamber 34 which has a predetermined radial depth and a predetermined axial length and which is disposed on the external surface of the sleeve 24. There are two sets of balancing chambers 36 and 38, which are arranged respectively at the locations adjacent to both ends of the annular gas chamber 34. Both balancing chambers 36 and 38 are similar in structure. Therefore, only balancing chamber 36 will be illustrated hereinafter. The balancing chamber 36 has at least three circular bores 40, 42 and 44, each of which is located on the same plane perpendicular to the central axis of the sleeve 24. The circular bores 40, 42 and 44 have the same diameter and are so arranged as to encircle the central axis of the sleeve 24 in such manners that they are spaced apart by 120 degrees and that they are in communication with the annular gas chamber 34.

The housing 26 has an opening 46, which is in communication with the annular gas chamber 34 and is dimensioned to receive a nozzle of the pump supplying the compressed gas. The annular gas chamber 34 is provided at the center thereof with an annular groove 50 in alignment with the opening 46 so as to permit the compressed gas to flow into the annular gas chamber 34 in a radiating manner.

Upon having entered the annular gas chamber 34 via the opening 46, the compressed gas is uniformly and directly distributed via the circular bores 40, 42 and 44 to the clearance formed between the outer surface 28 of the shaft 22 and the inner wall of the axial hole 30 of the sleeve 24. As a result, the compressed gas exerts uniformly a lateral pressure on the entire shaft 22, in view of the fact that the circular bores 40, 42 and 44 have the same diameter. In other words, the uniformly-distributed compressed gas in the clearance between the outer surface 28 of the shaft 22 and the inner wall of the axial hole 30 of the sleeve 24 acts as a lubricating agent to reduce the friction to a minimum.

By comparing the shaft assembly of the present invention with that of the prior art, the advantages of the present invention have become apparent. In other words, the shaft assembly of the present invention has overcome the drawbacks of the shaft assembly of the prior art by virtue of the fact that the former is devoid of the gas channels 9 and 10 as disclosed in the U.S. Pat. No. 3,776,609 mentioned previously. As described previously, the gas channels 9 and 10 are the main culprits responsible for the shortcomings of the shaft assembly of the prior art.

What is claimed is:

1. A pneumatic shaft assembly of machine tool comprising a housing, a sleeve lodged securely in said housing, and a shaft provided with a uniform outer diameter throughout and received in said sleeve in such a manner that it can rotate and move axially in relation to said sleeve; wherein said shaft assembly is characterized in that said sleeve is provided with an annular gas chamber of a depth and a length and with two sets of balancing chambers, each of which is in communication with said annular gas chamber and has at least three circular bores of identical diameter, with said circular bores of each set situated in such manners that they are on the same plane perpendicular to a central axis of said sleeve and that they are arranged equidistantly to encircle said central axis; wherein said shaft assembly is further characterized in that said housing is provided with an opening in communication with said annular gas chamber of said sleeve so as to permit a compressed gas to enter said annular gas chamber, from which said compressed gas is directed to flow to each of said balancing chambers and then to each of said circular bores, through which said compressed gas is uniformly distributed throughout a clearance formed between said shaft and said sleeve so as to exert a uniform lateral force on said shaft.

2. The pneumatic shaft assembly of machine tool in accordance with claim 1 wherein said sleeve has an annular groove located at center of said annular gas chamber and provided with a radial depth greater than said annular gas chamber; and wherein said opening of said housing is situated in a location opposite to said annular groove and is in communication with said annular groove.

* * * * *